(12) United States Patent
Taylor

(10) Patent No.: US 12,164,022 B2
(45) Date of Patent: Dec. 10, 2024

(54) PROXIMITY DETECTION SYSTEM FOR AN INDUSTRIAL MACHINE INCLUDING EXTERNALLY MOUNTED INDICATORS

(71) Applicant: Joy Global Surface Mining Inc, Milwaukee, WI (US)

(72) Inventor: Wesley P. Taylor, Glendale, WI (US)

(73) Assignee: Joy Global Surface Mining Inc, Milwaukee, WI (US)

(*) Notice: Subject to any disclaimer, the term of this patent is extended or adjusted under 35 U.S.C. 154(b) by 509 days.

(21) Appl. No.: 16/582,459

(22) Filed: Sep. 25, 2019

(65) Prior Publication Data

US 2020/0096627 A1    Mar. 26, 2020

Related U.S. Application Data

(60) Provisional application No. 62/736,249, filed on Sep. 25, 2018.

(51) Int. Cl.
  *G01S 13/88*     (2006.01)
  *F16P 3/14*      (2006.01)
  *G01S 7/04*      (2006.01)

(52) U.S. Cl.
  CPC .......... *G01S 13/886* (2013.01); *F16P 3/147* (2013.01); *G01S 7/04* (2013.01)

(58) Field of Classification Search
  CPC .. G01S 13/886; G01S 7/04; G01S 2013/9323; G01S 13/931; G01S 13/867; G01S 13/865; G01S 2013/9315; G01S 19/393; G01S 2013/9318; G01S 2013/93185; G01S 13/86; G01S 13/862; G01S 17/89; G01S 2013/93272; G01S 2013/93275; G01S 2013/93274; G01S 13/66; G01S 2013/93271;
  (Continued)

(56) References Cited

U.S. PATENT DOCUMENTS 5,430,450 A * 7/1995  Holmes ................... G01S 13/56
                                                           342/69
5,939,986 A   8/1999  Schiffbauer et al.
(Continued)

FOREIGN PATENT DOCUMENTS

CN      1595371 A       3/2005
EP      2746105 A1 *    6/2014   ............. B60Q 1/245
(Continued)

OTHER PUBLICATIONS

Chinese Patent Office Action for Application No. 201980072111.4 dated May 25, 2022 (25 pages including an English translation).
(Continued)

*Primary Examiner* — Olumide Ajibade Akonai
(74) *Attorney, Agent, or Firm* — Husch Blackwell LLP

(57) ABSTRACT

Embodiments described herein provide an industrial machine that includes one or more indicators mounted to an external portion of the industrial machine. The one or more indicators are configured to provide an indication to an individual external to the industrial machine that a proximity detection system has detected his or her presence external to the industrial machine. The one or more indicators are controlled to provide the indication to the individual using, for example, different colors of light, different intensities of light, or activation of different indicators.

17 Claims, 7 Drawing Sheets

(58) Field of Classification Search
CPC ..... G01S 2013/9325; G01S 2013/9324; G01S 13/88; G01S 13/08; G01S 13/885; G01S 2007/4977; F16P 3/147; G05D 1/0242; G06V 20/58; G06V 10/141; G06V 20/38; G06V 40/172; G06V 20/56; B60Q 9/008; B60Q 2300/42; B60Q 2300/41; B60Q 2300/45; B60Q 1/1423; B60Q 1/08; B60W 2420/408; G08G 1/167; G08G 1/16; G08G 1/165; G08G 1/166; G08G 1/005
USPC .......................................................... 342/27
See application file for complete search history.

(56) References Cited

U.S. PATENT DOCUMENTS

| | | | |
|---|---|---|---|
| 6,072,391 A * | 6/2000 | Suzuki | B60Q 1/302 340/815.45 |
| 6,784,800 B2 | 8/2004 | Orzechowski | |
| 7,932,809 B2 | 4/2011 | Nair et al. | |
| 8,115,650 B2 | 2/2012 | Dasilva et al. | |
| 8,193,665 B2 * | 6/2012 | Eiden | H05B 41/30 307/157 |
| 8,289,170 B2 | 10/2012 | Pryor et al. | |
| 8,355,003 B2 | 1/2013 | Pope | |
| 8,768,583 B2 * | 7/2014 | Hargrave, Jr. | E02F 9/262 340/436 |
| 9,836,941 B2 | 12/2017 | Mendiola et al. | |
| 10,323,386 B2 * | 6/2019 | Kiyota | G08B 13/19602 |
| 10,472,593 B2 * | 11/2019 | Morimoto | A61K 8/463 |
| 10,544,567 B2 * | 1/2020 | Petrany | E02F 9/205 |
| 10,876,702 B2 * | 12/2020 | Masuda | B60Q 1/04 |
| 10,933,798 B2 * | 3/2021 | Juette | H04N 7/183 |
| 2003/0158640 A1 * | 8/2003 | Pillar | G01M 17/00 701/29.4 |
| 2004/0222977 A1 * | 11/2004 | Bear | G06F 11/328 345/184 |
| 2006/0049938 A1 | 3/2006 | Wilson | |
| 2009/0243822 A1 | 10/2009 | Hinninger et al. | |
| 2010/0221071 A1 | 9/2010 | Hinshaw et al. | |
| 2012/0327261 A1 * | 12/2012 | Tafazoli Bilandi | E02F 9/24 348/E5.022 |
| 2013/0015963 A1 | 1/2013 | Stegmaier et al. | |
| 2013/0261903 A1 * | 10/2013 | Hargrave, Jr. | E02F 9/262 701/50 |
| 2014/0062756 A1 * | 3/2014 | Lamkin | G01S 13/933 342/29 |
| 2014/0267688 A1 | 9/2014 | Aich et al. | |
| 2014/0330449 A1 * | 11/2014 | Oman | B60R 25/245 701/2 |
| 2015/0268338 A1 * | 9/2015 | Freiburger | B60W 10/10 342/107 |
| 2016/0144895 A1 * | 5/2016 | Rittger | B60Q 9/002 701/301 |
| 2016/0193961 A1 * | 7/2016 | Fischer | G08G 1/0965 340/436 |
| 2016/0318437 A1 * | 11/2016 | Vilakathara | H05B 47/125 |
| 2017/0350557 A1 | 12/2017 | Hakins et al. | |
| 2018/0109762 A1 | 4/2018 | Aich et al. | |
| 2018/0186278 A1 * | 7/2018 | Song | B60Q 1/143 |
| 2018/0194272 A1 * | 7/2018 | Hibino | B60Q 1/0023 |
| 2018/0229649 A1 * | 8/2018 | Salter | B60Q 1/486 |
| 2018/0281668 A1 * | 10/2018 | Martin | B60Q 1/343 |
| 2019/0080313 A1 * | 3/2019 | Van Wiemeersch | B60R 25/305 |
| 2019/0172324 A1 | 6/2019 | Tonello | |
| 2019/0194913 A1 | 6/2019 | Petrany et al. | |
| 2020/0001778 A1 * | 1/2020 | Lotz | B60Q 1/305 |

FOREIGN PATENT DOCUMENTS

| | | | |
|---|---|---|---|
| JP | 3213336 U * | 11/2017 | |
| WO | WO-2019210931 A1 * | 11/2019 | E02F 9/24 |

OTHER PUBLICATIONS

Chilean Patent Office Action for Application No. 202100657 dated May 5, 2022 (12 pages including statement of relevance).
International Search Report and Written Opinion for Application No. PCT/US2019/052922 dated Dec. 16, 2019 (15 pages).
Examiner's Report for Application No. 3,113,443 dated Jan. 30, 2024 (6 pages).
Australian Examination Report for Application No. 2019347838 dated May 31, 2024 (3 pages).

* cited by examiner

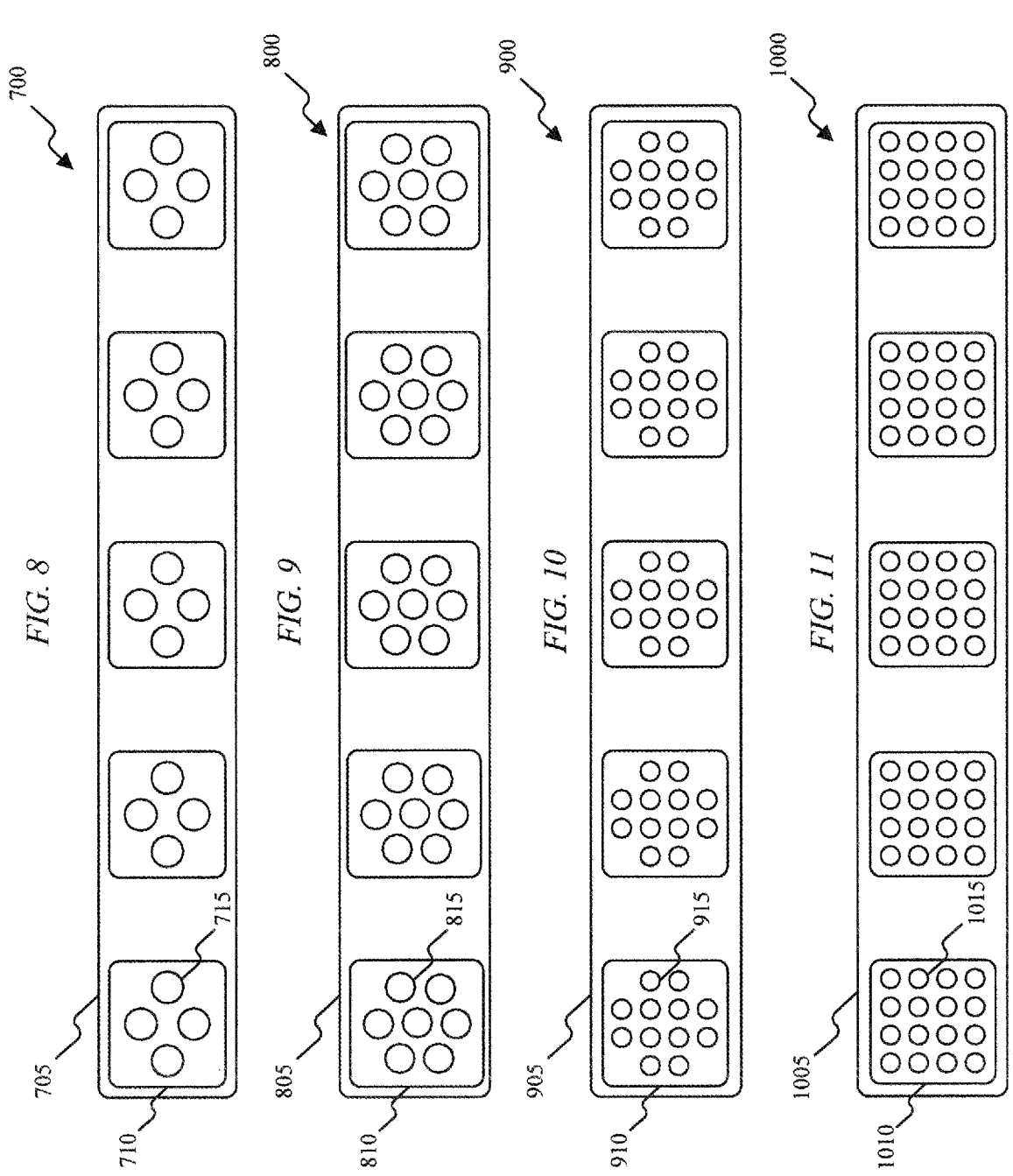

PROXIMITY DETECTION SYSTEM FOR AN INDUSTRIAL MACHINE INCLUDING EXTERNALLY MOUNTED INDICATORS

RELATED APPLICATIONS

This application claims the benefit of U.S. Provisional Patent Application No. 62/736,249, filed Sep. 25, 2018, the entire content of which is hereby incorporated by reference.

FIELD

Embodiments described herein relate to a proximity detection system.

SUMMARY

Autonomous industrial machines or semi-automated industrial machines include various external sensors or detectors that are important to such machines being able to perform their designated functions. People working in proximity to such vehicles have limited knowledge of what the vehicle is sensing or doing with respect to the peoples' actions. Proximity detection systems ("PDS") or obstacle detection systems ("ODS") do not typically provide any form of feedback to off-board personnel. Indications of such systems detecting an object may be provided to a remote or local operator of the industrial machine, but no indication is provided externally. Some autonomous machines do utilize stack lights to provide basic operational feedback (i.e., operational state of the industrial machine), but that feedback is limited and ambient (e.g., not targeted).

Embodiments described herein provide visual or optical feedback around the perimeter of an industrial machine. A PDS for the industrial machine is configured to monitor for objects in proximity to the industrial machine. The PDS is configured to control the operation of the industrial machine in a safe manner to avoid collisions or inhibited motion. A controller for the industrial machine is configured to receive signals from sensors that are included in the PDS. The controller is also configured to receive one or more outputs of the PDS related to, for example, a location of an object, a proximity of the object, and/or an object type. The controller is configured to generate optical feedback in the direction of the object detected by the PDS. Depending upon, for example, the location of the object, the proximity of the object, and/or the type of the object, the controller is configured to generate one or more control signals to control a subset of a plurality of lights. The subset of the plurality of lights are controlled to provide directed feedback to the object to indicate that the PDS has detected the presence of the object. As a result, for example, maintenance personnel are able to approach the industrial machine and be confident that the PDS has detected their presence, is tracking their movements, and will react appropriately to their presence. Absent such feedback, it could be dangerous for a person or a vehicle to approach the industrial machine.

Embodiments described herein provide an industrial machine that includes one or more indicators mounted to an external portion of the industrial machine. The one or more indicators are configured to provide an indication to an individual external to the industrial machine that a proximity detection system has detected his or her presence external to the industrial machine. The one or more indicators are controlled to provide the indication to the individual using, for example, different colors of light, different intensities of light, activation of different indicators, etc. The industrial machine is, for example, a blasthole drill, a rope shovel, etc.

Embodiments described herein provide an industrial machine that includes a housing, a plurality of sensors, a plurality of light sources, and a controller. The plurality of sensors is connected to the industrial machine. Each of the plurality of sensors is configured to generate an output signal related to a detected object in proximity to the housing of the industrial machine. The plurality of light sources is connected to the industrial machine. Each of the plurality of light sources is configured to be controlled to be illuminated. The controller is connected to each of the plurality of sensors and each of the plurality of light sources. The controller includes a non-transitory computer readable medium and a processing unit. The controller includes computer executable instructions stored in the computer readable medium for controlling operation of the industrial machine to receive the output signals from the plurality of sensors, determine whether an object is in proximity to the industrial machine based on the output signals from the plurality of sensors, classify the object as a first type of object or a second type of object, generate a first set of control signals to activate a first subset of the plurality of light sources when the object is the first type of object, and generate a second set of control signals to activate a second subset of the plurality of light sources when the object is the second type of object.

Embodiments described herein provide a computer-implemented method of providing an indication of an object being detected by a proximity detection system. The industrial machine includes a housing, a plurality of sensors, a plurality of light sources, a processing unit, and a non-transitory computer readable medium. The method includes receiving output signals from the plurality of sensors, determining whether the object is in proximity to the industrial machine based on the output signals from the plurality of sensors, classifying the object as a first type of object or a second type of object, generating a first set of control signals to activate a first subset of the plurality of light sources when the object is the first type of object, and generating a second set of control signals to activate a second subset of the plurality of light sources when the object is the second type of object.

Embodiments described herein provide a controller for providing an indication of an object being detected by a proximity detection system. The controller includes a processing unit and a non-transitory computer readable medium. The controller includes computer executable instructions stored in the computer readable medium for controlling operation of the industrial machine to receive output signals from the plurality of sensors, determine whether the object is in proximity to the industrial machine based on the output signals from the plurality of sensors, classify the object as a first type of object or a second type of object, generate a first set of control signals to activate a first subset of the plurality of light sources when the object is the first type of object, and generate a second set of control signals to activate a second subset of the plurality of light sources when the object is the second type of object.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIGS. 5-11 illustrate indicator arrays, according to embodiments described herein.

DETAILED DESCRIPTION

Embodiments described herein provide an industrial machine that includes one or more indicators mounted to an external portion of the industrial machine. The one or more indicators are configured to provide an indication to an individual external to the industrial machine that a proximity detection system has detected his or her presence external to the industrial machine. The one or more indicators are controlled to provide the indication to the individual using, for example, different colors of light, different intensities of light, activation of different indicators, etc. The industrial machine is, for example, a blasthole drill, a rope shovel, etc.

Figure 1:
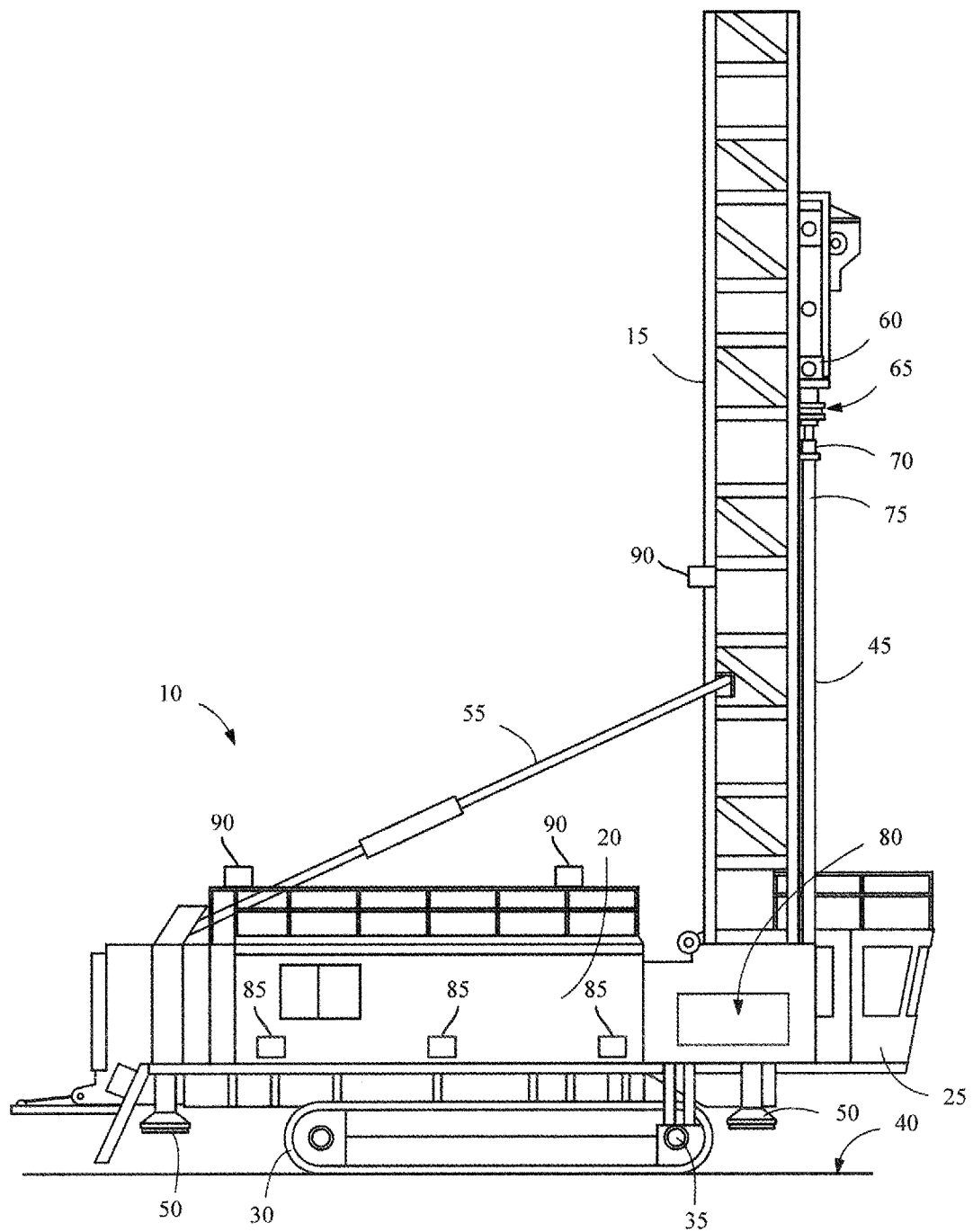
FIG. 1 illustrates an industrial machine, according to embodiments described herein.

FIG. 1 illustrates a blasthole drill 10 that includes a drill tower 15, a base 20 (e.g., a machinery house) beneath the drill tower 15 that supports the drill tower 15, an operator cab 25 coupled to the base 20, and crawlers 30 driven by a crawler drive 35 that drives the blasthole drill 10 along a ground surface 40. The blasthole drill 10 also includes a drill pipe 45 configured to extend downward (e.g., vertically) through the ground surface 40 and into a borehole. In some constructions, multiple drill pipes 45 are connected together to form an elongated drill string that extends into the borehole. The blasthole drill 10 also includes leveling jacks 50 coupled to the base 20 that support the blasthole drill 10 on the ground surface 40, and a brace 55 coupled to both the base 20 and the drill tower 15 that supports the drill tower 15 on the base 20. The drill tower 15 includes a drill head motor 60 coupled to the drill tower 15 that drives a drill head 65 and a coupling 70 that couples together the drill head 65 with an upper end 75 of the drill pipe 45. The blasthole drill 10 also includes a bit changer assembly 80 that manually or autonomously exchanges a drill bit on a lower end of the drill pipe 45. The bit changer assembly 80 also stores inactive drill bits during operation of the blasthole drill 10. Other constructions of the blasthole drill 10 do not include, for example, the operator cab 25, the brace 55, or one or more other components as described above. The blasthole drill 10 also includes a plurality of sensor/light modules 85 and a plurality of light modules 90. The sensor/light modules 85 incorporate sensors for a proximity detection system ("PDS") or an object detection system ("ODS"). The light modules 90 include lights similar to those in the sensor/light modules 85, but are only used to provide visual feedback and are not used for sensing. By including a plurality of sensor/light modules 85 and light modules 90 around the exterior of the blasthole drill 10, a subset of the sensor/light modules 85 and light modules 90 can be activated to provide a targeted indication to an object external to the blasthole drill 10 that the PDS has detected the object's presence.

Figure 2:
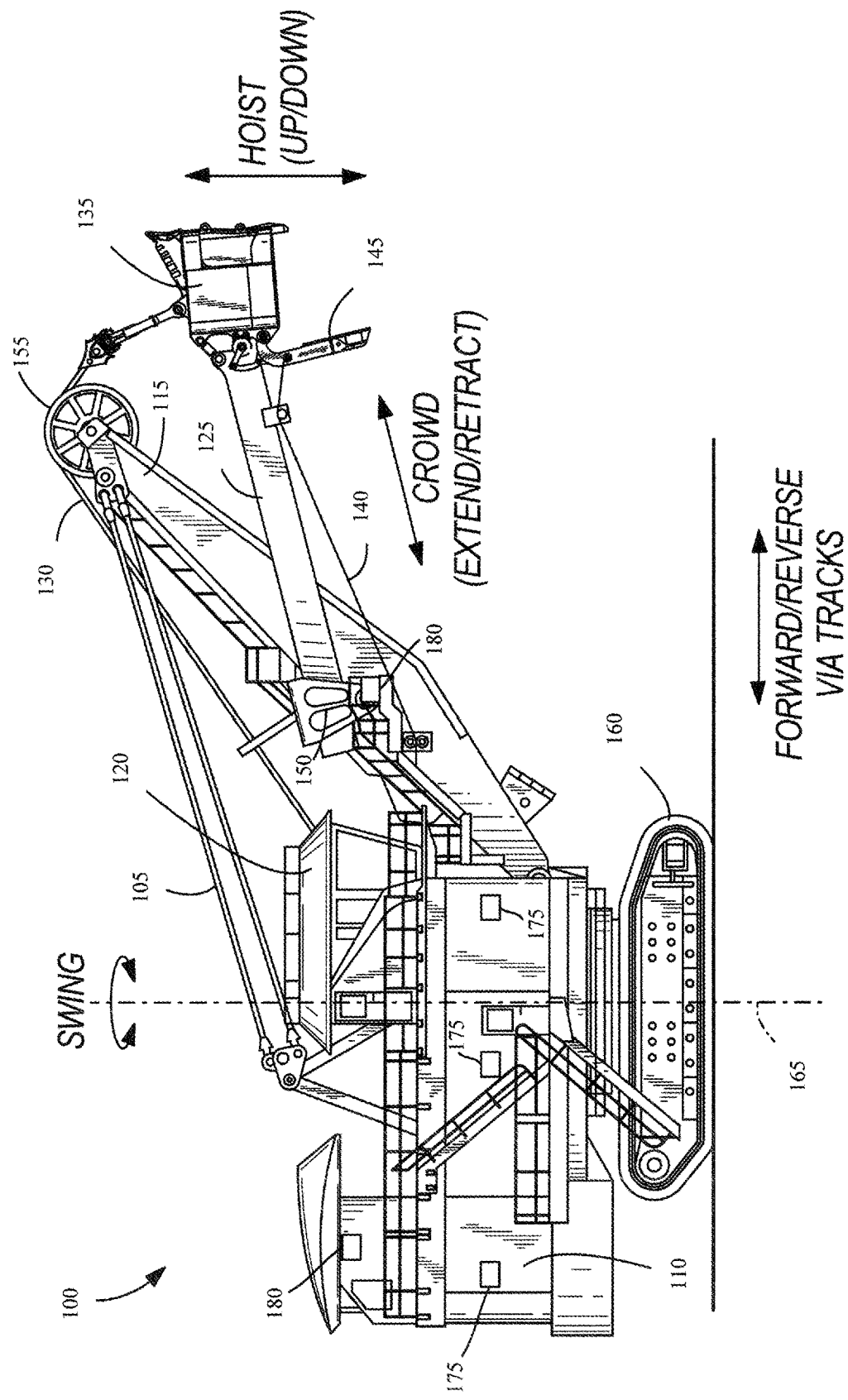
FIG. 2 illustrates an industrial machine, according to embodiments described herein.

FIG. 2 illustrates a rope shovel 100 that includes suspension cables 105 coupled between a base 110 and a boom 115 for supporting the boom 115, an operator cab 120, and a dipper handle 125. The rope shovel 100 also includes a wire rope or hoist cable 130 that may be wound and unwound within the base 110 to raise and lower an attachment or dipper 135, and a trip cable 140 connected between another winch (not shown) and the door 145. The rope shovel 100 also includes a saddle block 150 and a sheave 155. The rope shovel 100 uses four main types of movement: forward and reverse, hoist, crowd, and swing. Forward and reverse moves the entire rope shovel 100 forward and backward using the tracks 160. Hoist moves the attachment 135 up and down. Crowd extends and retracts the attachment 135. Swing pivots the rope shovel 100 around an axis 165. Overall movement of the rope shovel 100 utilizes one or a combination of forward and reverse, hoist, crowd, and swing. Other constructions of the rope shovel 100 do not include, for example, the operator cab 120 or one or more other components as described above. The rope shovel 100 also includes a plurality of sensor/light modules 175 and a plurality of light modules 180. The sensor/light modules 175 incorporate sensors for a PDS. The light modules 180 include lights similar to those in the sensor/light modules 175, but are only used to provide visual feedback and are not used for sensing. By including a plurality of sensor/light modules 175 and light modules 180 around the exterior of the rope shovel 100, a subset of the sensor/light modules 175 and light modules 180 can be activated to provide a targeted indication to an object external to the rope shovel 100 that the PDS has detected the object's presence. The blasthole drill 10 and the rope shovel 100 are generally referred to herein as the industrial machine 10, 100.

Figure 3:
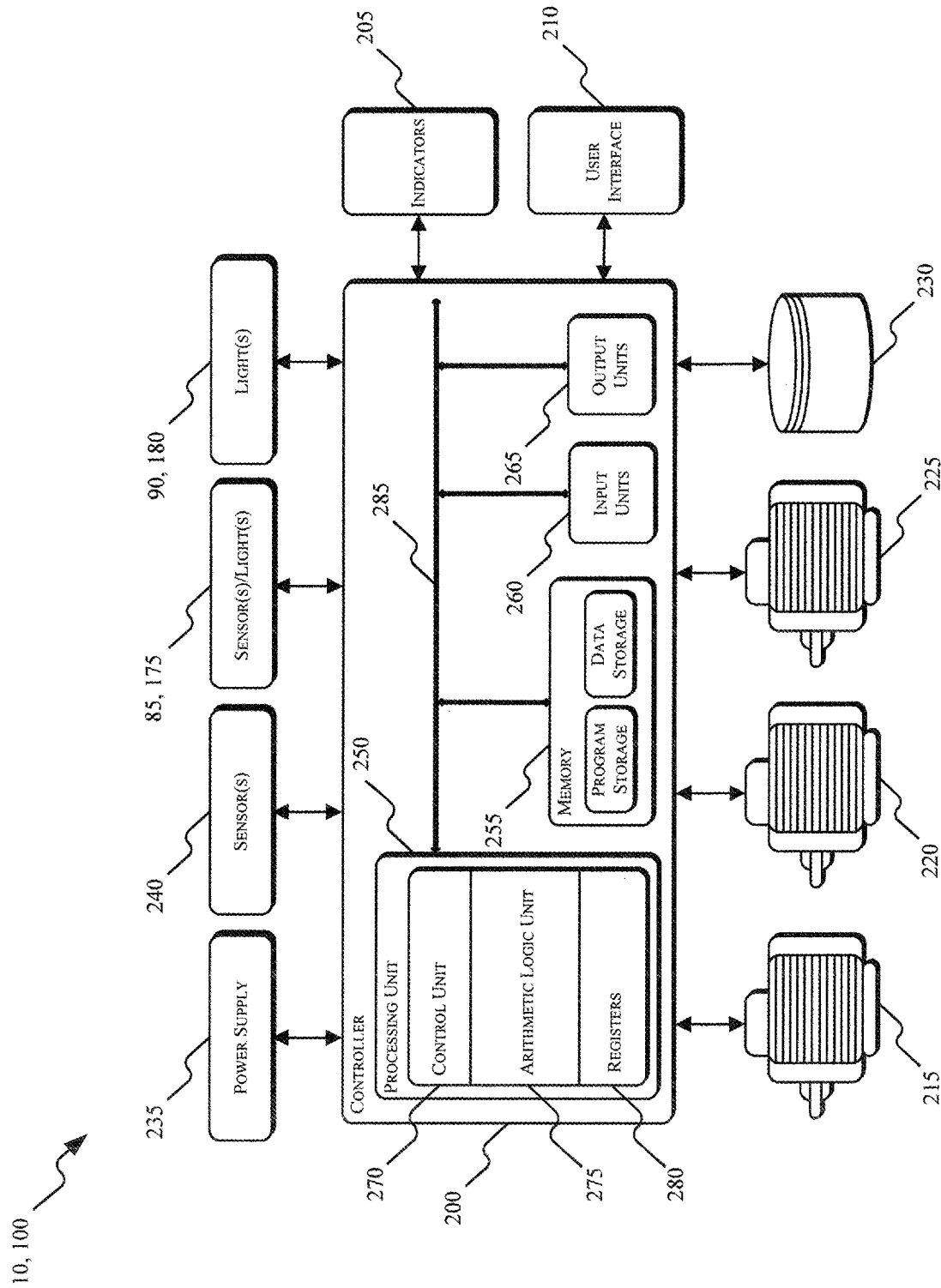
FIG. 3 illustrates a control system for an industrial machine, according to embodiments described herein.

FIG. 3 illustrates a controller 200 associated with the industrial machine 10, 100 of FIGS. 1 and 2. The controller 200 is electrically and/or communicatively connected to a variety of modules or components of the industrial machine 10, 100. For example, the illustrated controller 200 is connected to the sensor/light modules 85, 175, the light modules 90, 180, one or more indicators 205, a user interface module 210, one or more first actuation devices (e.g., motors, hydraulic cylinders, etc.) and first drives 215, one or more second actuation devices (e.g., motors, hydraulic cylinders, etc.) and second drives 220, one or more third actuation devices (e.g., motors, hydraulic cylinders, etc.) and third drives 225, a data store or database 230, a power supply module 235, and one or more sensors 240. The first actuation devices and drives 215, the second actuation devices and drives 220, and the third actuation devices and drives 225 are configured to receive control signals from the controller 200 to control, for example, hoisting, crowding, and swinging operations of the industrial machine 100. The controller 200 includes combinations of hardware and software that are configured, operable, and/or programmed to, among other things, control the operation of the industrial machine 10, 100, generate sets of control signals to activate the one or more indicators 205 (e.g., a liquid crystal display ["LCD"], one or more light sources [e.g., LEDs], etc.), monitor the operation of the industrial machine 10, 100, etc. The one or more sensors 240 include, among other things, a loadpin, a strain gauge, one or more inclinometers, gantry pins, one or more motor field modules (e.g., measuring motor parameters such as current, voltage, power, etc.), one or more rope tension sensors, one or more resolvers, RADAR, LIDAR, one or more cameras, one or more infrared sensors, etc.

The controller 200 includes a plurality of electrical and electronic components that provide power, operational control, and protection to the components and modules within the controller 200 and/or industrial machine 10, 100. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 3), and is implemented using a known computer architecture (e.g., a modified Harvard architecture, a von Neumann architecture, etc.). The processing unit 250, the memory 255, the input units 260, and the output units 265, as well as the various modules connected to the controller 200 are connected by one or more control and/or data buses (e.g., common bus 285). The control and/or data buses are shown generally in FIG. 3 for illustrative purposes. The use of one or more control and/or data buses for the interconnection between and communication among the various modules and components would be known to a person skilled in the art in view of the invention described herein.

The memory 255 is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the industrial machine 10, 100 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The power supply module 235 supplies a nominal AC or DC voltage to the controller 200 or other components or modules of the industrial machine 10, 100. The power supply module 235 is powered by, for example, a power source having nominal line voltages between 100V and 240V AC and frequencies of approximately 50-60 Hz. The power supply module 235 is also configured to supply lower voltages to operate circuits and components within the controller 200 or industrial machine 10, 100. In other constructions, the controller 200 or other components and modules within the industrial machine 10, 100 are powered by one or more batteries or battery packs, or another grid-independent power source (e.g., a generator, a solar panel, etc.).

The user interface module 210 is used to control or monitor the industrial machine 10, 100. The user interface module 210 includes a combination of digital and analog input or output devices required to achieve a desired level of control and monitoring for the industrial machine 10, 100. For example, the user interface module 210 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface module 210 can also be configured to display conditions or data associated with the industrial machine 10, 100 in real-time or substantially real-time. For example, the user interface module 210 is configured to display measured electrical characteristics of the industrial machine 10, 100, the status of the industrial machine 10, 100, etc. In some implementations, the user interface module 210 is controlled in conjunction with the one or more indicators 205 (e.g., LEDs, speakers, etc.) to provide visual or auditory indications (e.g., from a horn of the industrial machine 10, 100) of the status or conditions of the industrial machine 10, 100. In some implementations, the industrial machine 10, 100 is an autonomous industrial machine that does not require the user interface module 210. In such implementations, the user interface module 210 can be included in the industrial machine 10, 100 as a backup or to enable monitoring of the industrial machine 10, 100.

The controller 200 is configured to implement a proximity detection system ("PDS") or an obstacle detection systems ("ODS") that uses, for example, the sensors 240 to detect and classify an object in proximity to the industrial machine 10, 100. PDS and ODS are used interchangeably herein. For example, the PDS can use a combination of RADAR, LIDAR, and infrared sensors to detect objects in proximity to the industrial machine 10, 100 and classify the object as either a large object (e.g., a haul truck) or a small object (e.g., a person). An example of a PDS that can be used to detect an object in proximity to the industrial machine 10, 100 is described in U.S. Pat. No. 8,768,583, issued Jul. 1, 2014 and entitled "COLLISION DETECTION AND MITIGATION SYSTEMS AND METHODS FOR A SHOVEL," the entire content of which is hereby incorporated by reference.

After the controller 200 has detected and classified an object in proximity to the industrial machine 10, 100, the controller 200 is configured to control the indicators 205, sensor/light modules 85, 175, and/or light modules 180 to provide a visual indication to, for example, an individual external to the industrial machine 10, 100 that the PDS has detected his or her presence. Individuals in the industrial machine 10, 100 would be able to see the outputs of the PDS (e.g., with the user interface module 210) including the direction to a detected object, a distance to the object, and a risk severity. However, that information would conventionally not be available to off-board individuals external to the industrial machine 10, 100. The indicators 205 include one or more light sources (e.g., LEDs) mounted to external surfaces of the industrial machine 10, 100 (e.g., on the sensor/light modules 85, 175, the light modules 90, 180, etc.) that provide the visual indication to individuals external to the industrial machine 10, 100. The one or more light sources mounted to external surfaces of the industrial machine 10, 100 can include a series of lights installed around the base 20, 110 of the industrial machine 10, 100. The light sources provide, for example, directional information related to specific areas in which the PDS detects an object or person, which enables multiple objects or people in different areas (e.g., left, right, front, back, etc.) around the industrial machine 10, 100 to observe their specific status in relation to the PDS (e.g., based on which lights are illuminated) and the manner in which the lights are illuminated (e.g., strobing speed, color, intensity, etc.). In some embodiments, when the PDS detects a person or another smaller object, the controller 200 generates a first set of control signals to activate lights lower (e.g., on a lower portion) on the industrial machine 10, 100 (e.g., sensor/light modules 85, 175). In such embodiments, when the PDS detects a haul truck or another large object, the controller 200 is configured to generate a second set of control signals to activate lights higher (e.g., on an upper portion) on the industrial machine 10, 100 (e.g., light modules 90, 180). In other embodiments, when the PDS detects a haul truck or another large object, the controller 200 is configured to generate a third set of control signals to activate lights higher and lower on the industrial machine 10, 100 (e.g., sensor/light modules 85, 175 and light modules 90, 180).

The light sources are, for example, high intensity programmable strobes. The strobes can be any type of light source (e.g., LEDs) and can produce any desirable output color (e.g., green, yellow, red, etc.). The controller 200 is configured to control the frequency of the strobing of the light sources, the magnitude or intensity of the output of the light sources, the color of the output of the light sources, etc. The controller 200 controls the output of the light sources based on, for example, the type of object detected (e.g., person, vehicle, etc.), the proximity of the object to the industrial machine 10, 100, etc. In some embodiments, as an object gets closer and closer to the industrial machine, light sources are strobed at an increasingly high frequency (e.g., linearly dependent upon proximity), which indicates that the object has been detected and the proximity of the object to the industrial machine is being tracked. In some embodiments, when the PDS detects a large object (e.g., a haul truck) the light sources can be illuminated in a first color (e.g., blue) and when the PDS detects a small object (e.g., a person) the light sources are illuminated in a second color (e.g., red). In some embodiments, as an object gets closer and closer to the industrial machine, light sources are activated at an increasingly high intensity (e.g., linearly dependent upon proximity), which indicates that the object has been detected and the proximity of the object to the industrial machine is being tracked.

Figure 4:
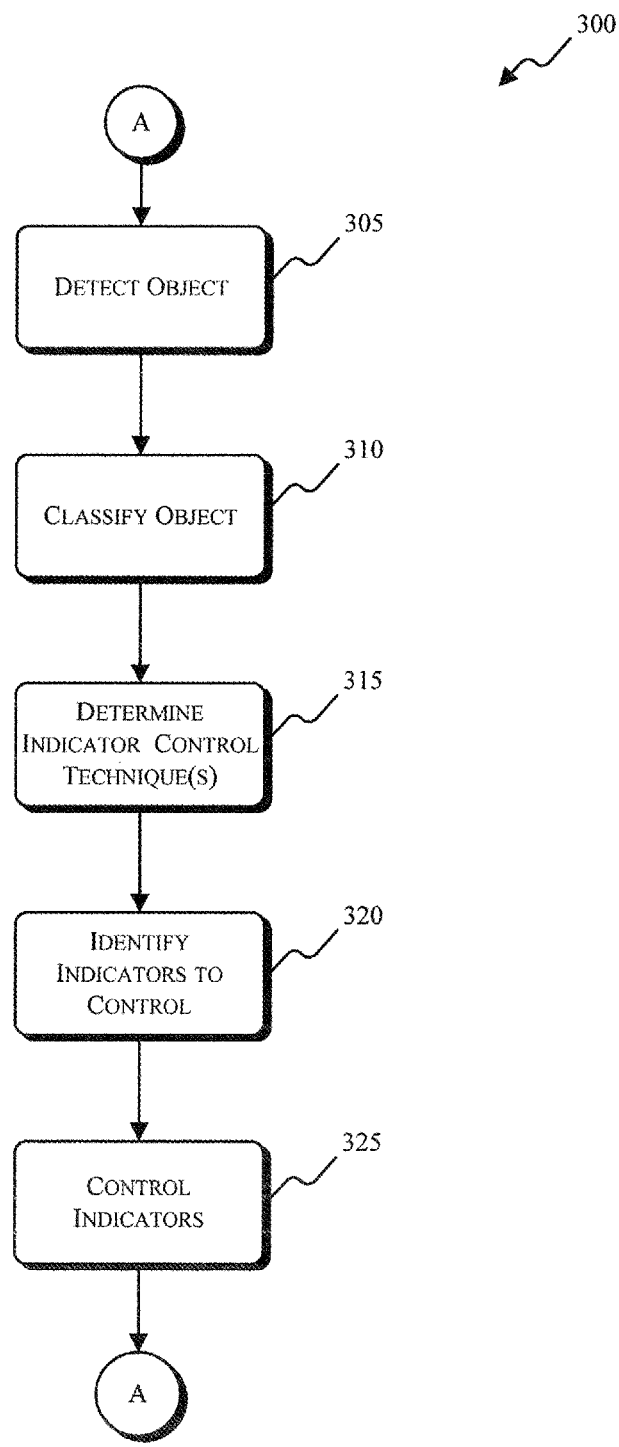
FIG. 4 is a process for providing an indication of object detection using a proximity detection system, according to embodiments described herein.

FIG. 4 illustrates a process 300 for providing a visual indication to an individual external to the industrial machine 10, 100 that the PDS has detected his or her presence. The process 300 begins with the PDS detecting the presence of an object (e.g., a vehicle, a person, etc.) (STEP 305). After the object has been detected, the PDS is configured to classify the object as, for example, a vehicle or a person (STEP 310). After the PDS has classified the object at STEP 310, the PDS determines one or more indicator control techniques (STEP 315). The one or more indicator control techniques include determining a color of illumination, a frequency of strobing, an intensity of illumination, etc. After STEP 315, the PDS determines or identifies which indicators or lights to control (STEP 320). Determining which indicators to control can include changing activated indicators over time (e.g., as the detected object or the industrial machine 10, 100 move from one location to another location). The indicators are then controlled by the controller 200 as determined using the PDS (STEP 325). In some embodiments, the functionality of the PDS and external indicators can be verified by having a person walk around the industrial machine 10, 100 at varying distances from the industrial machine 10, 100 to see if the lights that are illuminated follow, if the lights strobe at a correct frequency, if the light illuminate at a correct color, etc.

Figure 5:
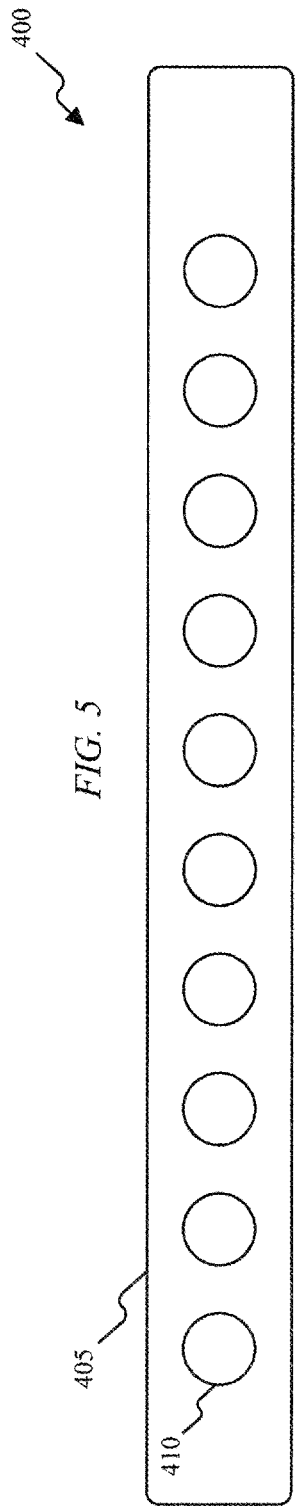
Figure 6:
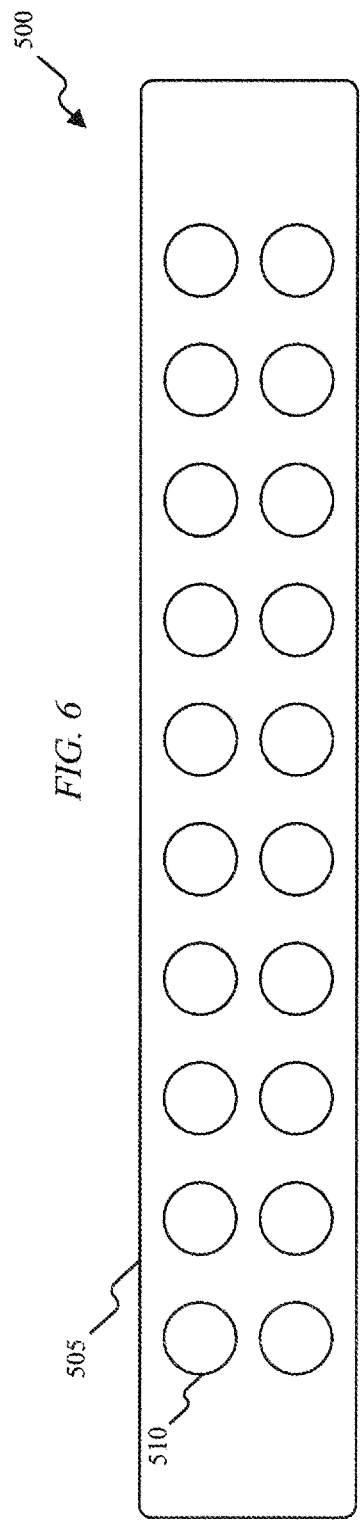
Figure 7:
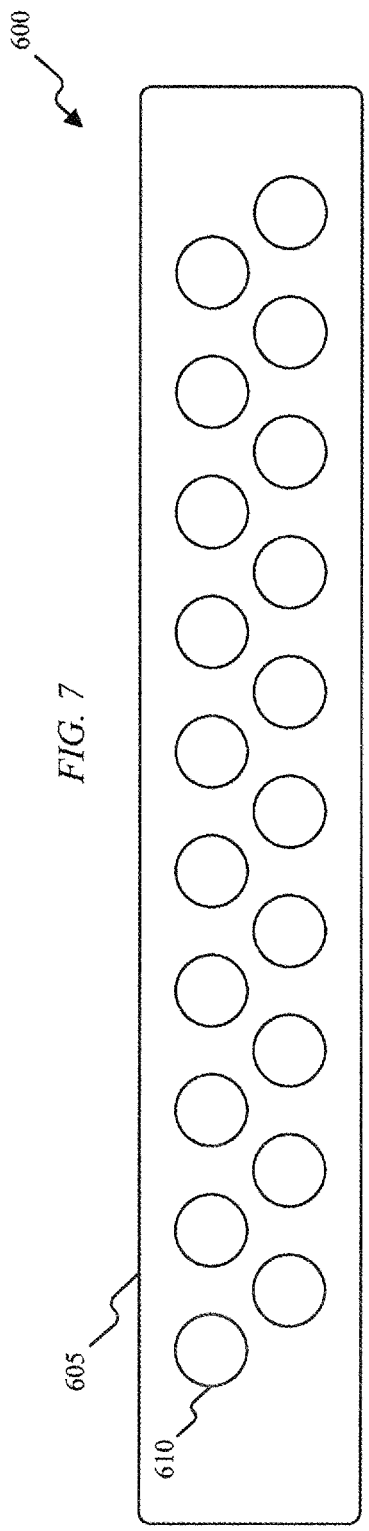

FIGS. 5-11 illustrate various implementations or arrangements of indicators that can be used in conjunction with the process 300 of FIG. 4. FIG. 5 illustrates an implementation 400 that includes an indicator array 405 and a plurality of indicators 410. The indicators 410 are arranged in a single row. FIG. 6 illustrates an implementation 500 that includes an indicator array 505 and a plurality of indicators 510. The indicators 510 are arranged in double rows. FIG. 7 illustrates an implementation 600 that includes an indicator array 605 and a plurality of indicators 610. The indicators 610 are arranged in offset double rows.

FIG. 8 illustrates an implementation 700 that includes an indicator array 705. The indicator array 705 includes groupings 710 of a plurality of indicators 715. The indicators 715 are arranged in a diamond configuration including four indicators. FIG. 9 illustrates an implementation 800 that includes an indicator array 805. The indicator array 805 includes groupings 810 of a plurality of indicators 815. The indicators 815 are arranged in a honeycomb configuration including six indicators. FIG. 10 illustrates an implementation 900 that includes an indicator array 905. The indicator array 905 includes groupings 910 of a plurality of indicators 915. The indicators 915 are arranged in a cross configuration including twelve indicators. FIG. 11 illustrates an implementation 1000 that includes an indicator array 1005. The indicator array 1005 includes groupings 1010 of a plurality of indicators 1015. The indicators 1015 are arranged in a square configuration including sixteen indicators. In various implementations of the indicators, groupings of indicators can include between one and one hundred indicators.

Figure 12A:
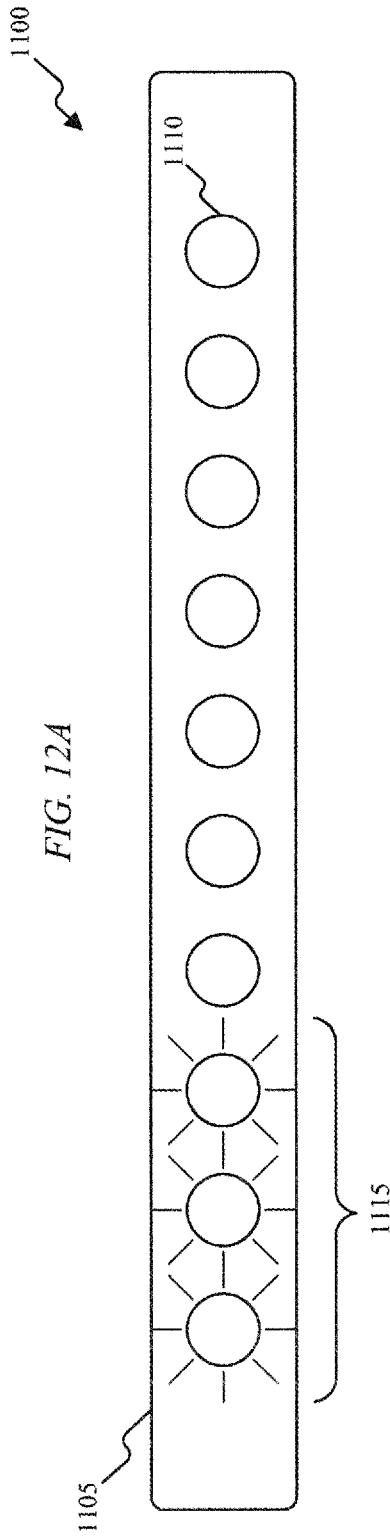
FIGS. 12A, 12B, and 12C illustrate an indicator array providing an indication of object detection using a proximity detection system, according to embodiments described herein.
Figure 12B:
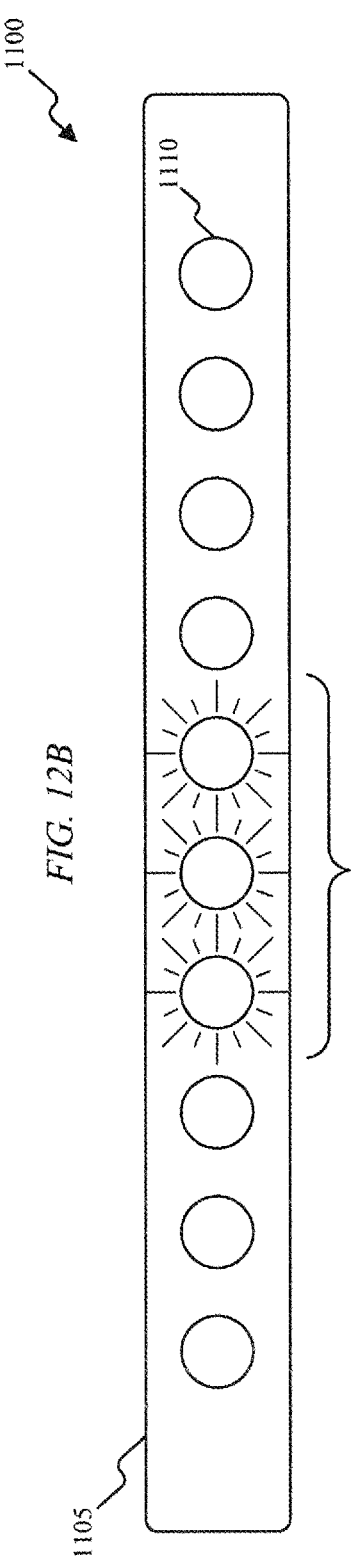
Figure 12C:
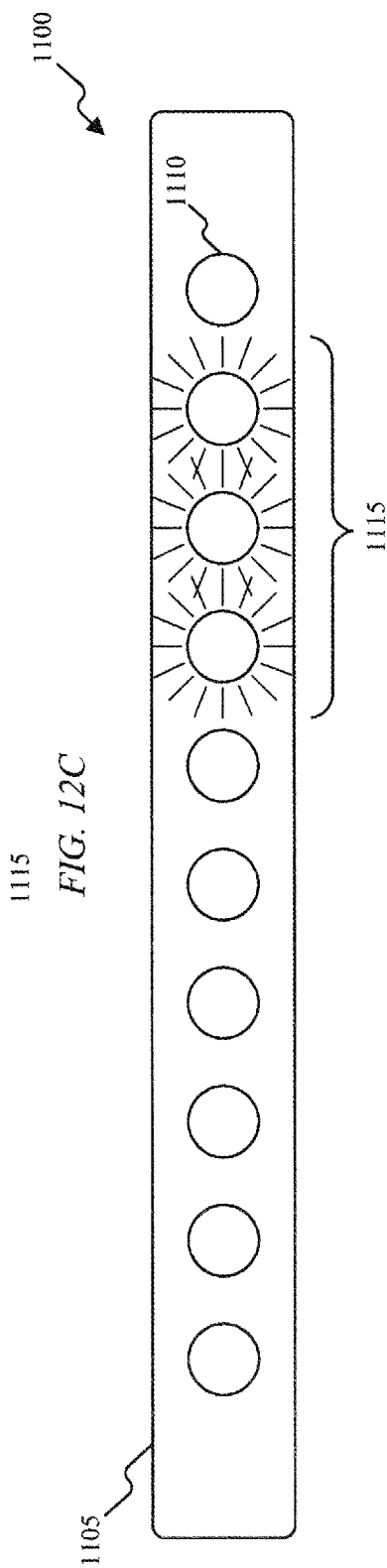

FIGS. 12A, 12B, and 12C illustrate the control of indicators based on the detection and of an object by the PDS. FIGS. 12A-12C illustrate an implementation 1100 that includes an indicator array 1105 and a plurality of indicators 1110 arranged in a single row. A subset 1115 of the indicators 1110 are activated to provide an indication of, for example, the detection of a person in proximity to the industrial machine 10, 100. In FIG. 12A, the subset 1115 of indicators 1110 are illuminated in a particular color and at a particular intensity. As the object detected by the PDS or the industrial machine 10, 100 moves, the subset 1115 of the indicators 1110 that are activated can change, as illustrated in FIG. 12B. In addition to changing the subset 1115 of indicators 1110 that are activated, the particular color of illumination for the indicators 1110 and/or the intensity of the illumination of the indicators 1110 can be changed. As illustrated in FIG. 12C, the subset 1115 of indicators 1110 that are activated can continue to change as the object detected by the PDS of the industrial machine 10, 100 continues to move. The particular color of illumination for the indicators 1110 and/or the intensity of the illumination of the indicators 1110 can also continue to be changed. In some embodiments, the industrial machine 10, 100 includes one or more LED displays that can provide a visual indication of a type of object that is being detected (e.g., person, small object, haul truck, large object, etc.).

Thus, embodiments described herein provide, among other things, an industrial machine that includes one or more external indicators for providing an indication of a detected object external and in proximity to an industrial machine. Various features and advantages are set forth in the following claims.

What is claimed is:

1. An industrial machine comprising:
   a housing;
   a plurality of sensors connected to the industrial machine, each of the plurality of sensors configured to generate an output signal related to a detected object in proximity to the housing of the industrial machine;
   a plurality of light sources mounted to an external surface of the industrial machine and spaced apart from one another around a perimeter of the housing, each of the plurality of light sources oriented to face off-board personnel, each of the plurality of light sources configured to be controlled to be illuminated in a direction away from the industrial machine; and
   a controller connected to each of the plurality of sensors and each of the plurality of light sources, the controller including a non-transitory computer readable medium and a processing unit, the controller including computer executable instructions stored in the computer readable medium for controlling operation of the industrial machine to:
      receive a first plurality of output signals from the plurality of sensors at a first time,
      determine, based on the first plurality of output signals, whether an object is positioned within a first predetermined distance of a first portion of a perimeter of the industrial machine,
      responsive to determining that the object is positioned within the first predetermined distance of the first portion of the perimeter of the industrial machine. generate a first set of control signals to illuminate a first subset of the plurality of light sources, wherein the first subset of the plurality of light sources are associated with the first portion of the perimeter of the industrial machine,
      receive a second plurality of output signals from the plurality of sensors at a second time,
      determine, based on the second plurality of output signals, whether the object has moved to within a second predetermined distance of a second portion of the perimeter of the industrial machine, wherein the second portion of the perimeter of the industrial machine is different than the first portion of the perimeter of the industrial machine,
      responsive to determining that the object has moved to within the second predetermined distance of the second portion of the perimeter of the industrial machine, generate a second set of control signals to illuminate a second subset of the plurality of light sources, wherein the second subset of the plurality of light sources are associated with the second portion of the perimeter of the industrial machine.

2. The industrial machine of claim 1, wherein at least one of the plurality of sensors and at least one of the plurality of light sources are included in a module that is connected to the industrial machine, and wherein at least one of the plurality of light sources is a programmable strobe light.

3. The industrial machine of claim 1, the controller further comprising computer executable instructions stored in the computer readable medium for controlling operation of the industrial machine to:
   determine a value for the proximity of the object to the industrial machine; and
   generate the first set of control signals to illuminate the first subset of the plurality of light sources at a frequency that is dependent upon the value for the proximity of the object to the industrial machine.

4. The industrial machine of claim 1, wherein at least one of the plurality of sensors is configured to use RADAR to sense the object.

5. The industrial machine of claim 1, the controller further comprising computer executable instructions stored in the computer readable medium for controlling operation of the industrial machine to:
   determine a value for the proximity of the object to the industrial machine; and
   generate the first set of control signals to illuminate the first subset of the plurality of light sources at an intensity that is dependent upon the value for the proximity of the object to the industrial machine.

6. The industrial machine of claim 1, wherein:
the first subset of the plurality of light sources are located on a lower portion of the industrial machine; and
the second subset of the plurality of light sources are located on an upper portion of the industrial machine.

7. The industrial machine of claim 1, wherein at least one of the plurality of light sources includes an array of indicators in an arrangement selected from the group consisting of a single row, a double row, an offset double row, a diamond, a honeycomb, a cross, and a square.

8. A computer-implemented method of providing an indication of an object being detected by a proximity detection system, an industrial machine including a housing, a plurality of sensors, a plurality of light sources mounted to an external surface of the industrial machine and spaced apart from one another around a perimeter of the industrial machine, a processing unit, and a non-transitory computer readable medium, the method comprising:
receiving a first plurality of output signals from the plurality of sensors at a first time;
determining, based on the first plurality of output signals, whether the object is positioned within a first predetermined distance of a first portion of the perimeter of the industrial machine;
responsive to determining that the object is positioned within the first predetermined distance of the first portion of the perimeter of the industrial machine, generating a first set of control signals to illuminate a first subset of the plurality of light sources, wherein the first subset of the plurality of light sources are associated with the first portion of the perimeter of the industrial machine,
receiving a second plurality of output signals from the plurality of sensors at a second time,
determining, based on the second plurality of output signals, whether the object has moved to within a second predetermined distance of a second portion of the perimeter of the industrial machine, wherein the second portion of the perimeter of the industrial machine is different than the first portion of the perimeter of the industrial machine,
responsive to determining that the object has moved to within the second predetermined distance of the second portion of the perimeter of the industrial machine, generating a second set of control signals to illuminate a second subset of the plurality of light sources, wherein the second subset of the plurality of light sources are associated with the second portion of the perimeter of the industrial machine.

9. The computer-implemented method of claim 8, further comprising:
determining a value for the proximity of the object to the industrial machine.

10. The computer-implemented method of claim 9, further comprising:
generating the first set of control signals to illuminate the first subset of the plurality of light sources at a frequency that is dependent upon the value for the proximity of the object to the industrial machine.

11. The computer-implemented method of claim 9, further comprising:
generating the first set of control signals to illuminate the first subset of the plurality of light sources at an intensity that is dependent upon the value for the proximity of the object to the industrial machine.

12. The computer-implemented method of claim 8, wherein at least one of the plurality of sensors is configured to use RADAR to sense the object.

13. A controller for providing an indication of an object being detected by a proximity detection system, the controller including a processing unit and a non-transitory computer readable medium, the controller comprising computer executable instructions stored in the computer readable medium for controlling operation of an industrial machine to:
receive a first plurality of output signals from a plurality of sensors at a first time;
determine, based on the first plurality of output signals, whether the object is positioned within a first predetermined distance of a first portion of a perimeter of the industrial machine;
responsive to determining that the object is positioned within the first predetermined distance of the first portion of the perimeter of the industrial machine, generate a first set of control signals to illuminate a first subset of the plurality of light sources mounted to an external surface of the industrial machine and spaced apart from one another around the perimeter of the housing, wherein the first subset of the plurality of light sources are associated with the first portion of the perimeter of the industrial machine,
receive a second plurality of output signals from the plurality of sensors at a second time,
determine, based on the second plurality of output signals, whether the object has moved to within a second predetermined distance of a second portion of the perimeter of the industrial machine, wherein the second portion of the perimeter of the industrial machine is different than the first portion of the perimeter of the industrial machine,
responsive to determining that the object has moved to within the second predetermined distance of the second portion of the perimeter of the industrial machine, generate a second set of control signals to illuminate a second subset of the plurality of light sources, wherein the second subset of the plurality of light sources are associated with the second portion of the perimeter of the industrial machine.

14. The controller of claim 13, the controller further comprising computer executable instructions stored in the computer readable medium for controlling operation of the industrial machine to:
determine a value for the proximity of the object to the industrial machine.

15. The controller of claim 14, the controller further comprising computer executable instructions stored in the computer readable medium for controlling operation of the industrial machine to:
generate the first set of control signals to illuminate the first subset of the plurality of light sources at a frequency that is dependent upon the value for the proximity of the object to the industrial machine.

16. The controller of claim 14, the controller further comprising computer executable instructions stored in the computer readable medium for controlling operation of the industrial machine to:
generate the first set of control signals to illuminate the first subset of the plurality of light sources at an intensity that is dependent upon the value for the proximity of the object to the industrial machine.

17. The controller of claim 13, wherein at least one of the plurality of sensors is configured to use RADAR to sense the object.

\* \* \* \* \*